(12) United States Patent
Mehr et al.

(10) Patent No.: US 11,761,341 B2
(45) Date of Patent: Sep. 19, 2023

(54) PROTECTIVE COATING SYSTEMS FOR GAS TURBINE ENGINE APPLICATIONS AND METHODS FOR FABRICATING THE SAME

(71) Applicant: HONEYWELL INTERNATIONAL INC., Charlotte, NC (US)

(72) Inventors: Mehrad Mehr, Morris Plains, NJ (US);
John Downs, Morris Plains, NJ (US);
Bahram Jadidian, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/443,693

(22) Filed: Jul. 27, 2021

(65) Prior Publication Data
US 2023/0033942 A1 Feb. 2, 2023

(51) Int. Cl.
*C23C 28/04* (2006.01)
*F01D 5/28* (2006.01)

(52) U.S. Cl.
CPC ............ *F01D 5/288* (2013.01); *C23C 28/042* (2013.01); *F05D 2230/31* (2013.01); *F05D 2230/90* (2013.01); *F05D 2300/514* (2013.01); *F05D 2300/6033* (2013.01)

(58) Field of Classification Search
CPC .............................. F01D 5/288; C23C 28/042
See application file for complete search history.

(56) References Cited

U.S. PATENT DOCUMENTS

| | | | |
|---|---|---|---|
| 7,087,266 B2 | 8/2006 | Darolia et al. | |
| 8,124,252 B2 | 2/2012 | Cybulsky et al. | |
| 10,094,236 B2 | 10/2018 | Luthra | |
| 10,125,618 B2 | 11/2018 | Lee | |
| 10,233,760 B2 | 3/2019 | Lee | |
| 10,421,692 B2 | 9/2019 | Kriby et al. | |
| 10,808,565 B2 | 10/2020 | Walston et al. | |
| 10,858,950 B2 | 12/2020 | Shi et al. | |
| 2005/0202168 A1* | 9/2005 | Movchan | C23C 30/00 427/248.1 |
| 2009/0162674 A1 | 6/2009 | Boutwell et al. | |
| 2015/0197456 A1* | 7/2015 | Oboodi | F01D 5/288 427/446 |
| 2016/0153288 A1 | 6/2016 | Luthra | |
| 2016/0160664 A1 | 6/2016 | Luthra et al. | |
| 2018/0022649 A1 | 1/2018 | Matsumoto et al. | |
| 2019/0284673 A1* | 9/2019 | Landwehr | C23C 28/347 |
| 2019/0345074 A1* | 11/2019 | Pin | C04B 41/4527 |

FOREIGN PATENT DOCUMENTS

CA 2686332 C 8/2014

OTHER PUBLICATIONS

Kawai, Crack Initiation Criteria in EBC under Thermal Stress, Coatings 2019, 9, 697, p. 1-27 (Year: 2019).*
Richards, Response of ytterbium disilicate-silicon environmental barrier coatings to thermal cycling in water vapor, Acta Materialia, vol. 106, Mar. 2016, p. 1-14 (Year: 2016).*
Xu, Yue, "Rare Earth Silicate Environmental Barrier Coatings: Present Status and Prospective," Ceramics International 43, Feb. 1, 2017.

* cited by examiner

*Primary Examiner* — Tabatha L Penny
(74) *Attorney, Agent, or Firm* — LORENZ & KOPF, LLP (57) ABSTRACT

A method of applying a protective coating to a substrate includes the steps of: providing a turbine engine component substrate formed of a ceramic matrix composite material, forming an environmental barrier coating layer including a rare earth disilicate material directly on the substrate, treating an outer surface of the environmental barrier coating layer to form a thermal barrier coating layer including a porous rare earth monociliate material directly on the environmental barrier coating layer. The step of treating the outer surface is performed using a thermal process consisting of the application of heat or a chemical-thermal process consisting of the application of heat and a chemical. The method further includes infiltrating at least a portion of the pores with a metal solution or suspension.

11 Claims, 6 Drawing Sheets

PROTECTIVE COATING SYSTEMS FOR GAS TURBINE ENGINE APPLICATIONS AND METHODS FOR FABRICATING THE SAME

TECHNICAL FIELD

The present disclosure generally relates to protective coatings for gas turbine engine applications and methods for fabricating such coatings.

BACKGROUND

Turbine engines are used as the primary power source for various kinds of aircraft and other vehicles. The engines may also serve as auxiliary power sources that drive air compressors, hydraulic pumps, and industrial electrical power generators. Most turbine engines generally follow the same basic power generation procedure. Compressed air is mixed with fuel and burned, and the expanding hot combustion gases are directed against stationary and rotary turbine vanes in the engine. The vanes turn the high velocity gas flow partially sideways to impinge onto turbine blades mounted on a rotatable turbine disk. The force of the impinging gas causes the turbine disk to spin at high speed. Jet propulsion engines use the power created by the rotating turbine disk to draw more air into the engine, and the high velocity combustion gas is passed out of the gas turbine aft end to create forward thrust. Other engines use this power to turn one or more propellers, electrical generators, or other devices.

High temperature turbine components such as turbine blades, shrouds, and nozzles made from silicon nitride or silicon carbide have the potential to appreciably increase the operating temperatures of turbine engines. The high temperature and high pressure environment of the turbine engine as well as the high gas velocity can cause erosion of silicon based ceramics. The mechanism of some of the erosion loss is due to the formation of $SiO_2$ and SiO gas. Typically, combustion gas environments, including turbine engines, contain about 10% water vapor. Oxygen containing water in the turbine reacts with silicon nitride or silicon carbide to form silica scale on silicon based ceramic surfaces. Water vapor can also react with the silica scale to form silicon hydroxide, which is volatile. Evaporation of silicon hydroxide from ceramic surfaces and erosion of ceramic caused by high speed combustion gases passing over ceramic surfaces leads to the loss of ceramic material from ceramic combustor and turbine components.

U.S. Pat. No. 6,159,553 and US 2002/0136835 A1 show protective ceramic coatings. Tantalum oxide alloyed with lanthanum oxide provides an environmental barrier coating (EBC). However, tantalum oxide permits diffusion of oxygen, resulting in the formation of a $SiO_2$ layer below the tantalum oxide layer. Published U.S. patent application 2002/0098391 by Tanaka et al discloses the use of rare earth silicates to form a protective coating to a silicon based substrate ceramic material. But the process disclosed by Tanaka limits the coating composition because it allows interaction of the coating with the substrate.

Accordingly, there is a need for an improved coating and method to apply the coating for a high temperature (>2600° F. (>1425° C.)) barrier between an environmental coating and a substrate of silicon nitride or silicon carbide. There is also a need for a diffusion coating that will prevent migration of cations out of a silicon-based substrate. There is as well a need to coat complex parts with a uniform dense oxidation resistant coating at a minimal cost. Furthermore, other desirable features and characteristics of the present invention will become apparent from the subsequent detailed description of the invention and the appended claims, taken in conjunction with the accompanying drawings and this background of the invention.

BRIEF SUMMARY

The present disclosure generally relates to protective coatings for gas turbine engine applications and methods for fabricating such coatings. In one embodiment, a method of applying a protective coating to a substrate includes the steps of: providing a turbine engine component substrate formed of a ceramic matrix composite material, forming an environmental barrier coating layer including a rare earth disilicate material directly on the substrate, treating an outer surface of the environmental barrier coating layer to form a thermal barrier coating layer including a porous rare earth monociliate material directly on the environmental barrier coating layer. The step of treating the outer surface is performed using a thermal process consisting of the application of heat or a chemical-thermal process consisting of the application of heat and a chemical. The method further includes infiltrating at least a portion of the pores with a metal solution or suspension.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWING

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Silicon carbide—silicon carbide matrix ("SiC—SiC") and silicon nitride ("$Si_3N_4$" or simply "SiN") materials are currently limited in operational use temperature by oxidation which begins around 2400° F., or even lower in some instances. While there are many coating methods that have been put forth, all claiming to resolve the issues of other methods, they each have issues of their own. In other words, gaining a benefit in a property from one process or material often leads to a shortfall in another property. The present disclosure provides an approach to creating an oxidation/thermal barrier coating for SiC—SiC or SiN substrate materials to allow the use temperature to be increased to about 2600° F. to about 2800° F. The approach employs a rare earth disilicate EBC coating that is disposed onto the substrate, and then subjected to thermal or carbon monoxide-based processing to decompose an outer surface of the rare earth disilicate coating to form a rare earth monosilicate porous outer layer. This porous outer layer may then be infiltrated with a metal salt solution or a metal oxide nanoparticle suspension. Further thermal processing allows the metal oxide or salt (which converts to oxide) to chemically integrate with the porous monosilicate layer, effectively forming a thermal barrier coating (TBC) layer over the rare earth disilicate EBC coating, which may increase melting point temperature capability beyond the capability of the monosilicate.

Turbine Engine/Turbine Section

Figure 1:
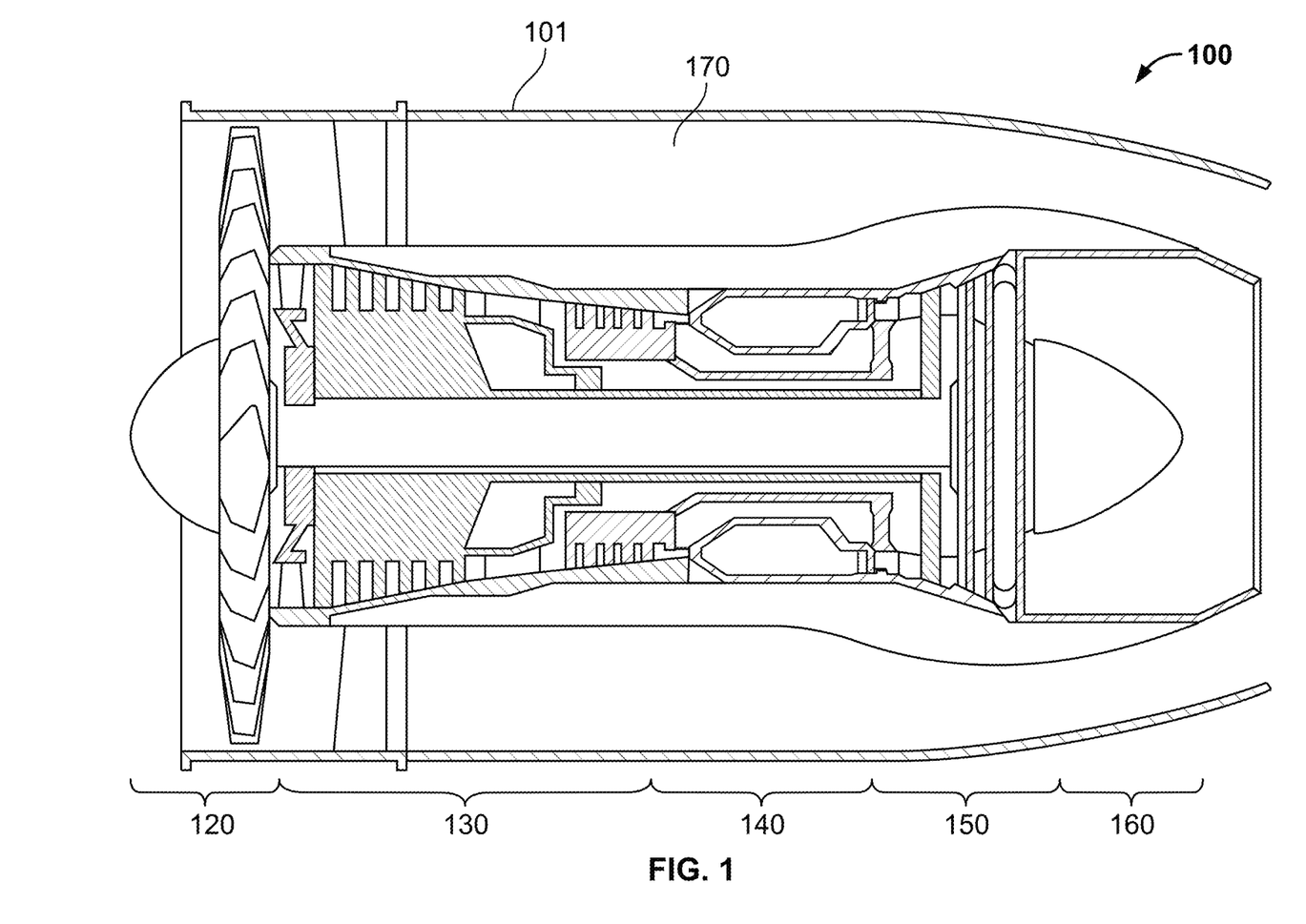
FIG. 1 is a partial cross-sectional view of a gas turbine engine in accordance with an exemplary embodiment.

As initially noted, embodiments of the present disclosure find particular application in the "hot" or turbine sections of gas turbine engines. Turning now to the Figures, FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. The turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
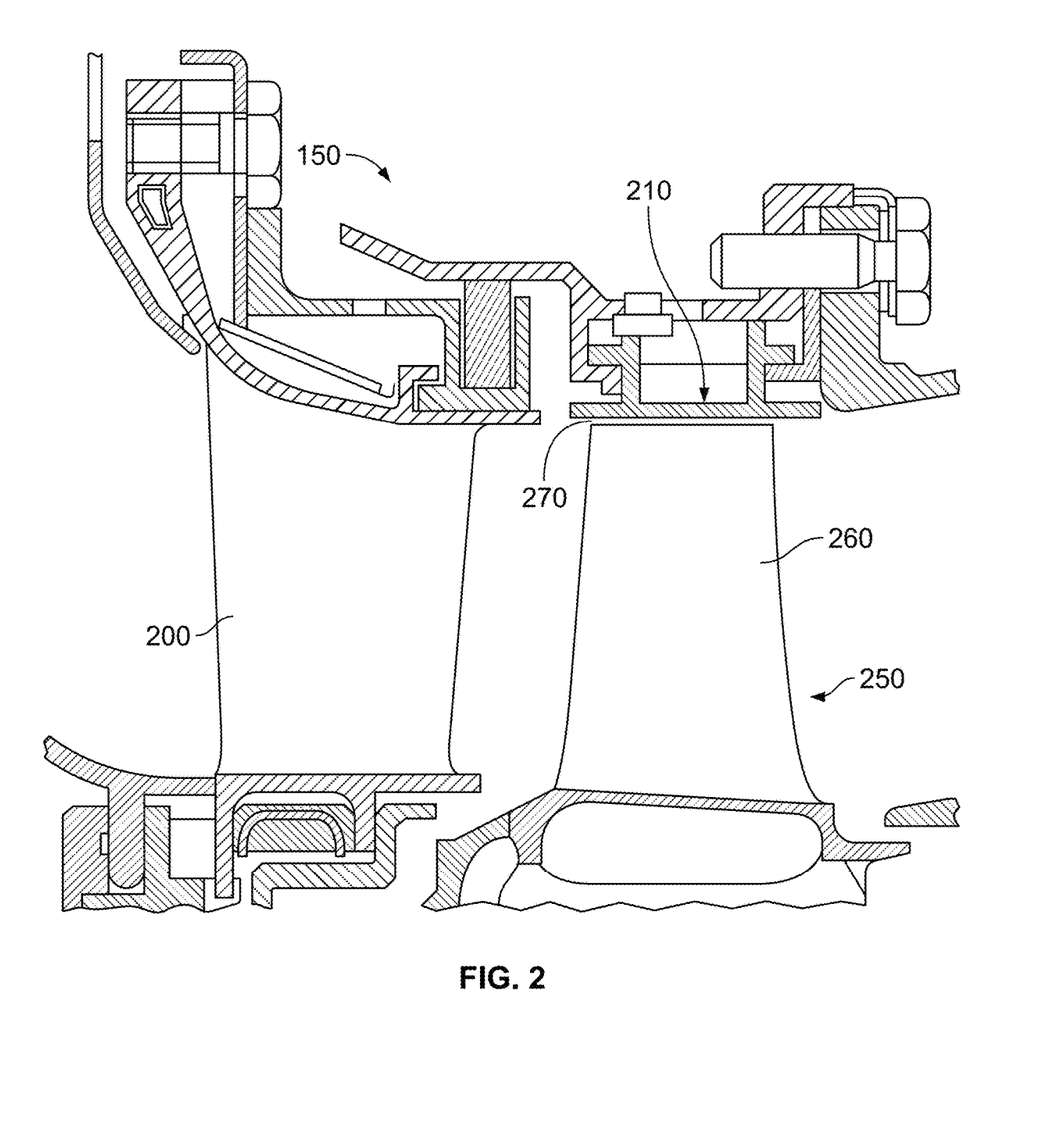
FIG. 2 is a partial, sectional elevation view illustrating a portion of a turbine section of the gas turbine engine of FIG. 1 in accordance with an exemplary embodiment.

FIG. 2 is a partial cross-sectional side view of a turbine section of an engine, such as the turbine section 150 of engine 100 of FIG. 1 in accordance with an exemplary embodiment. The turbine section 150 includes a turbine stator 200 and a turbine rotor 250 surrounded by a shroud 210 defining a gas flow path through which hot, combusted air from an upstream compressor section (e.g. compressor section 130 of FIG. 1) is directed. The cylindrical shroud 210 is disposed concentric to the rotor 250 to optimize aerodynamic efficiency and forms a radial gap (i.e., blade running clearance) 270 with an outermost diameter of the rotor 250. Although only one turbine stator 200 and one turbine rotor 250 are shown, such stators 200 and rotors 250 are typically arranged in alternating axially spaced, circumferential rows. As used herein, the term "axial" refers to a direction generally parallel to the engine centerline, while the term "radial" refers to a direction generally perpendicular to the engine centerline.

The rotor 250 generally includes rotor blades 260 (one of which is shown) mounted on a rotor disc (not shown), which in turn is coupled to an engine shaft (not shown). The turbine stator 200 directs the air toward the turbine rotor 250. The air impinges upon rotor blades 260 of the turbine rotor 250, thereby driving the turbine rotor 250 for power extraction. To allow the turbine section 150 to operate at desirable elevated temperatures, certain components are coating with the EBC/TBC coatings of the present disclosure, such as the shroud or nozzles.

Ceramic Substrate Materials

As noted above, various hot section components as illustrated in FIG. 2 may be formed of a silicon nitride or silicon carbide fiber/silicon carbide matrix composite material. In one example, as generally known in the art, a SiC—SiC ceramic matrix composite material may include a SiC fiber-bonded ceramic or a SiC fiber-bonded ceramic having a graded structure, for example. Regarding the SiC fiber-bonded ceramic, such a material may generally include inorganic fibers having mainly a sintered SiC structure, each of which contains 0.01-1 wt. % of oxygen (O) and at least one or more metal atoms of metal atoms in Groups 2A, 3A, and 3B, and a 1-100 nm interfacial layer containing carbon (C) as a main component formed between the fibers. Further, the SiC fiber-bonded ceramic having a graded structure may generally include a matrix, the matrix including inorganic fibers having mainly a sintered SiC structure containing 0.01-1 wt. % of oxygen (O) and at least one or more metal atoms of metal atoms in Groups 2A, 3A, and 3B, and a 1-100 nm interfacial layer containing carbon (C) and/or boron nitride (BN) as a main component formed between the fibers, a surface portion having a ceramic structure including mainly SiC and being formed on at least part of the surface of the matrix, a boundary portion interposed between the surface portion and the matrix and having a graded structure that changes from the structure of the matrix to the structure of the surface portion gradually and continuously.

These SiC—SiC materials include a volume fraction of about 90% or more of SiC-based fibers. Such materials have high fracture toughness and are insensitive to defects. The fiber material constituting the SiC fiber-bonded ceramic is mainly inorganic fibers that include a sintering structure containing mainly SiC and/or SiCN, contain about 0.01-1 wt. % of oxygen (O) and at least one metal atom selected from the group including metal atoms in Groups 2A, 3A, and 3B, and are bonded very close to the closest-packed structure. The inorganic fibers including a sintered SiC structure include mainly a sintered polycrystalline n-SiC structure, or include crystalline particulates of β-SiC and C. In a region containing a fine crystal of carbon (C) and/or an extremely small amount of oxygen (O), where β-SiC crystal grains sinter together without grain boundary second phase interposed therebetween, a strong bond between SiC crystals can be obtained.

Figure 3:
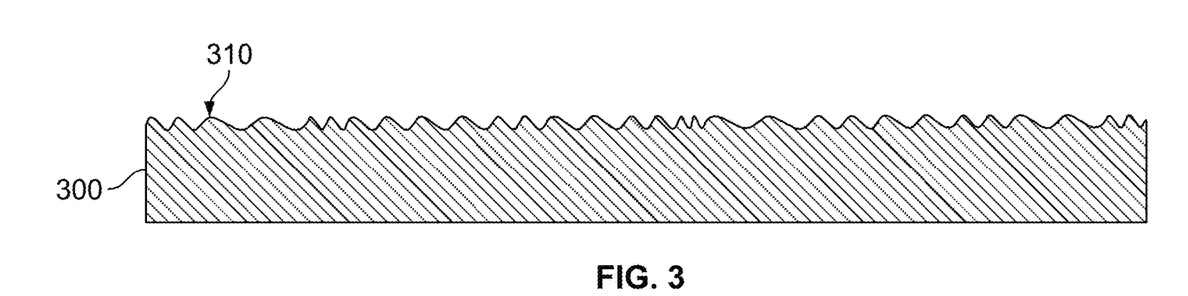
FIG. 3 illustrates, in cross section, the surface of an exemplary turbine component substrate made of a SiC—SiC material, in one exemplary embodiment.

FIG. 3 illustrates, in cross section, the surface of an exemplary turbine component substrate 300. FIG. 3 is a cross-sectional view of substrate 300 formed of a SiC—SiC material as described above upon which is to be disposed a protective coating system in accordance with an exemplary embodiment of the present disclosure. As shown in FIG. 3, the substrate 300 has a generally irregular or "wavy" outer surface 310, including "pits" and "valleys," upon which the protective coating system is to be disposed, and which may be formed by the woven fibers of the ceramic matric composite. The irregular surface includes deviations (+/−) from planar of several mils, such as about 1 mil to about 5 mils. The outer surface 310 may also have larger defects beyond the illustrated irregular surface. These larger defects may include deviations from planarity of about 30 mils to about 50 mils or greater, in some instances.

Rare Earth Disilicate EBC Layer

Figure 4:
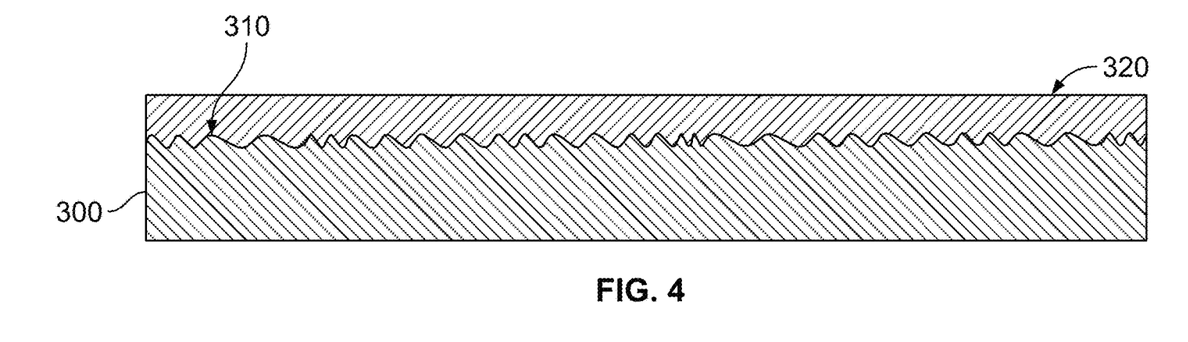
FIG. 4 illustrates, in cross section, the surface of the exemplary turbine component substrate of FIG. 3, having been coated with a rare earth disilicate EBC layer, in one exemplary embodiment.

Referring now to FIG. 4, disposed over the substrate surface 310 is EBC coating layer 320. EBC coating layer 320 is formed, for example, to a thickness from 10 mils to about 100 mils, for example from about 20 mils to about 50 mils. The EBC coating layer 320 is provided as an environmental barrier coating to enhance the operating capabilities of a gas turbine engine component fabricated with the SiC—SiC substrate as described above. For example, in one embodiment, the EBC coating layer is provided for protection in high temperature and high pressure environments of the turbine engine, which can cause oxidation and eventual erosion of silicon based ceramics. In particular embodiments, the addition of EBC coating layer 320, in part, functions to raise the suitable operating temperature of a component formed with substrate 300 to about 2600° F. to about 2800° F. or greater.

The EBC coating layer 320 may generally include a rare-earth disilicate material. As known in the art, rare earth elements include, among various others, strontium, lanthanum, yttrium, scandium, and others. For some embodiments, disilicate of yttrium and scandium are particularly suitable. The EBC coating layer 320 may be applied over the substrate 300 coating layer using any known methods. These methods include, but are not limited to, plasma spraying, physical vapor deposition (PVD), and electron beam physical vapor deposition (EB-PVD), and dipping.

Conversion of Disilicate to Monosilicate

As initially noted, the approach employed in the present disclosure utilizes the rare earth disilicate EBC coating, just described, that is disposed onto the substrate, and then subjected to thermal or carbon monoxide-based processing to decompose an outer surface of the rare earth disilicate coating to form a rare earth monosilicate porous outer layer. This porous outer layer may then be infiltrated with a metal salt solution or a metal oxide nanoparticle suspension. The disilicate decomposes to the more stable monosilicate phase above about 2400° F. surface temperature in a combustion environment. This monosilicate transformation will occur normally in service, but it can be produced by other methods in more controlled manners. These other methods result in a porous surface structure that can be further treated to form more stable high temperature oxides or silicides through the impregnation of different metal nitrates, carbonates or oxides that can be reacted with the surface in a step separate from the coating sintering where there is risk of different phases to cause problems with the densification of the coating. The advantage of this being that high temperature phases can be achieved at temperatures low enough to prevent continued sintering of the EBC. Moreover, because this is a porous layer that is formed in a stable condition from the starting EBC, there is a chemical transition that occurs between the dense disilicate EBC and the porous monosilicate surface.

Figure 5:
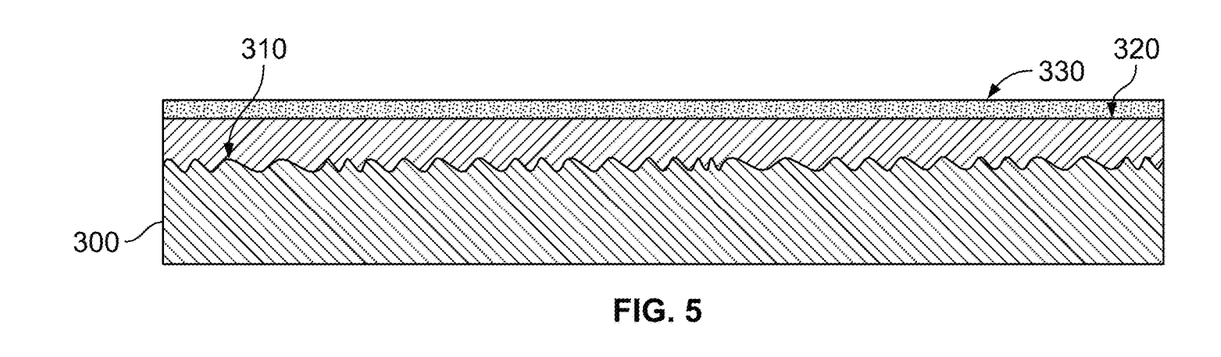
FIG. 5 illustrates, in cross section, the surface of the exemplary turbine component substrate of FIG. 3, having been coated with a rare earth disilicate EBC layer that has been partially converted at its outer surface to a rare earth monosilicate, in one exemplary embodiment.

FIG. 5 illustrates the substrate 300 having the disilicate EBC coating 320 thereon having been partially converted to porous monosilicate layer 330. The thickness of the porous layer 330 may be from about 5 microns to about 25 microns, such as about 10 microns to about 20 microns, and will have consumed some of the disilicate layer, resulting in this layer being commensurately thinner than previously described. The pores may be of various shapes and sizes. In some embodiments, the porosity of coating layer 330 may be from about 10% to about 70% (the percentage indicates the amount, by volume, of void space as a result of the presence of pores). In other embodiments, the porosity may be from about 25% to about 50%. The number and distribution of pores may be substantially equivalent throughout the thickness of layer 330. In other embodiments, processing may be provided such that there is a porosity gradient within layer 330. For example, a greater or lesser degree of porosity may be provided in areas of layer 330 that are relative closer to layer 320, whereas a lesser or greater degree of porosity may be provided in areas of layer 330 that are relatively further from layer 320. As known in the art, greater porosity provides greater thermal barrier capabilities, but renders the material less stable. Higher porosity will also likely compromise the mechanical properties of the coating. As such, in one embodiment, a relatively lesser porosity (for example from about 10% to about 40%) is provided in areas of layer 330 that are relatively closer to layer 320, and a relatively greater porosity (for example from about 40% to about 70%) is provided in areas of layer 330 that are relatively further from layer 320.

The conversion of the disilicate to the monosilicate may be accomplished in several manners. Using either manner, this surface treatment will improve chemical stability of the silicon nitride or SiC/SiC component EBC coatings at high temperatures, provide a mechanically compliant layer that reduced CTE mismatch thermal stresses, reduce the coating thermal conductivity coefficient for all turbine components, reducing secondary cooling loads, and provide abradability to improve blade tip rub tolerance for shrouds. The treatment will improve engine performance by increasing engine efficiency. Being able to increase cycle temperatures allows for higher thermodynamic efficiency. The reduced cooling load lower cooling requirements reducing parasitic cooling loads and potentially reduce engine core size.

Figure 6:
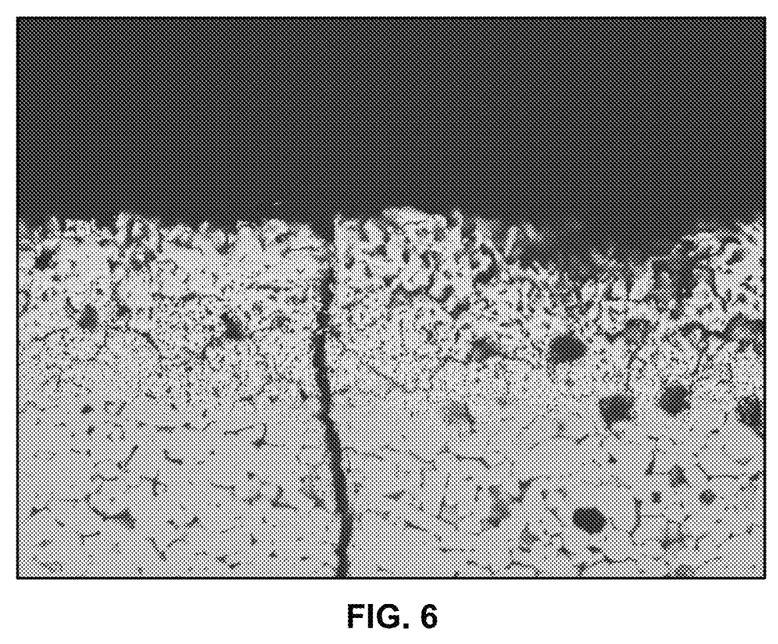
FIG. 6 is a cross-sectional micrograph of a disilicate EBC layer having been thermally treated to form porous monosilicate layer, in one exemplary embodiment.

For example, in one embodiment, a thermal treatment is employed. As initially noted, the disilicate decomposes to the more stable monosilicate phase above about 2400° F.

surface temperature in a combustion environment. Accordingly, for the thermal treatment, the coated turbine component may be exposed to temperatures in excess of 2400° F. in a reducing/oxygen-poor environment for a period of time. Moreover, depending on the degree of porosity desired to be formed from the layer 320, two or more cycles of heating may be employed, ranging in various times and temperatures. Thermal treatment can be by the use of a flame, torch, or in more controlled environment such as a furnace. Higher CO concentrations and higher temperatures increase the transformation rates. Transformation rates dictate morphology and pore structures (for example highly-porous, finger-like structures on surface, depth of transformation, etc.) FIG. 6 is a cross-sectional micrograph of an EBC layer 320 having been thermally treated as described above to form porous monosilicate layer 330. As can be seen, the porosity increases from the interface with layer 320 to the outer surface.

Figure 7:
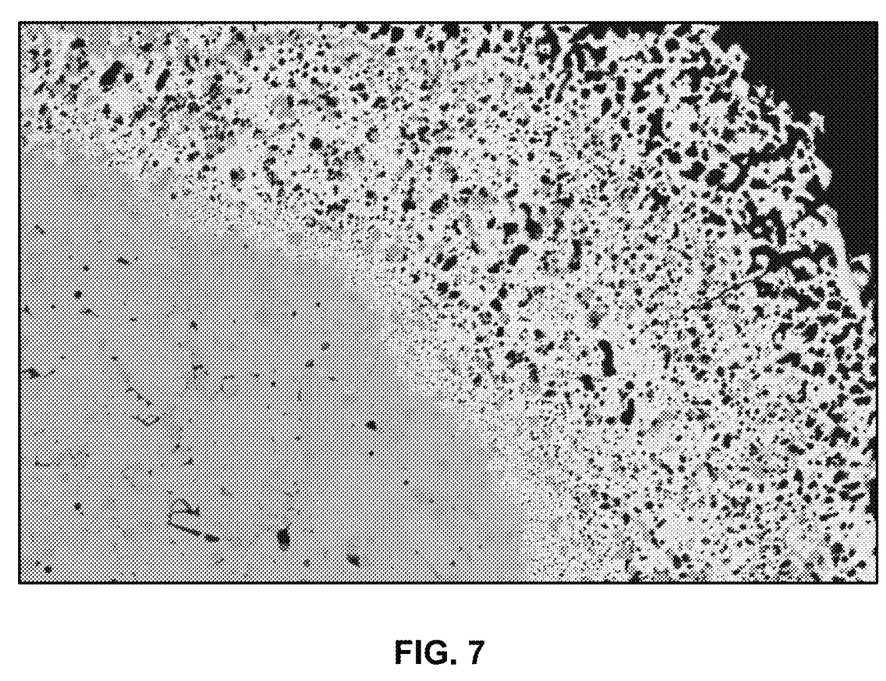
FIG. 7 is a cross-sectional micrograph of a disilicate EBC layer having been chemically-thermally treated to form porous monosilicate layer, in one exemplary embodiment.
Figure 8:
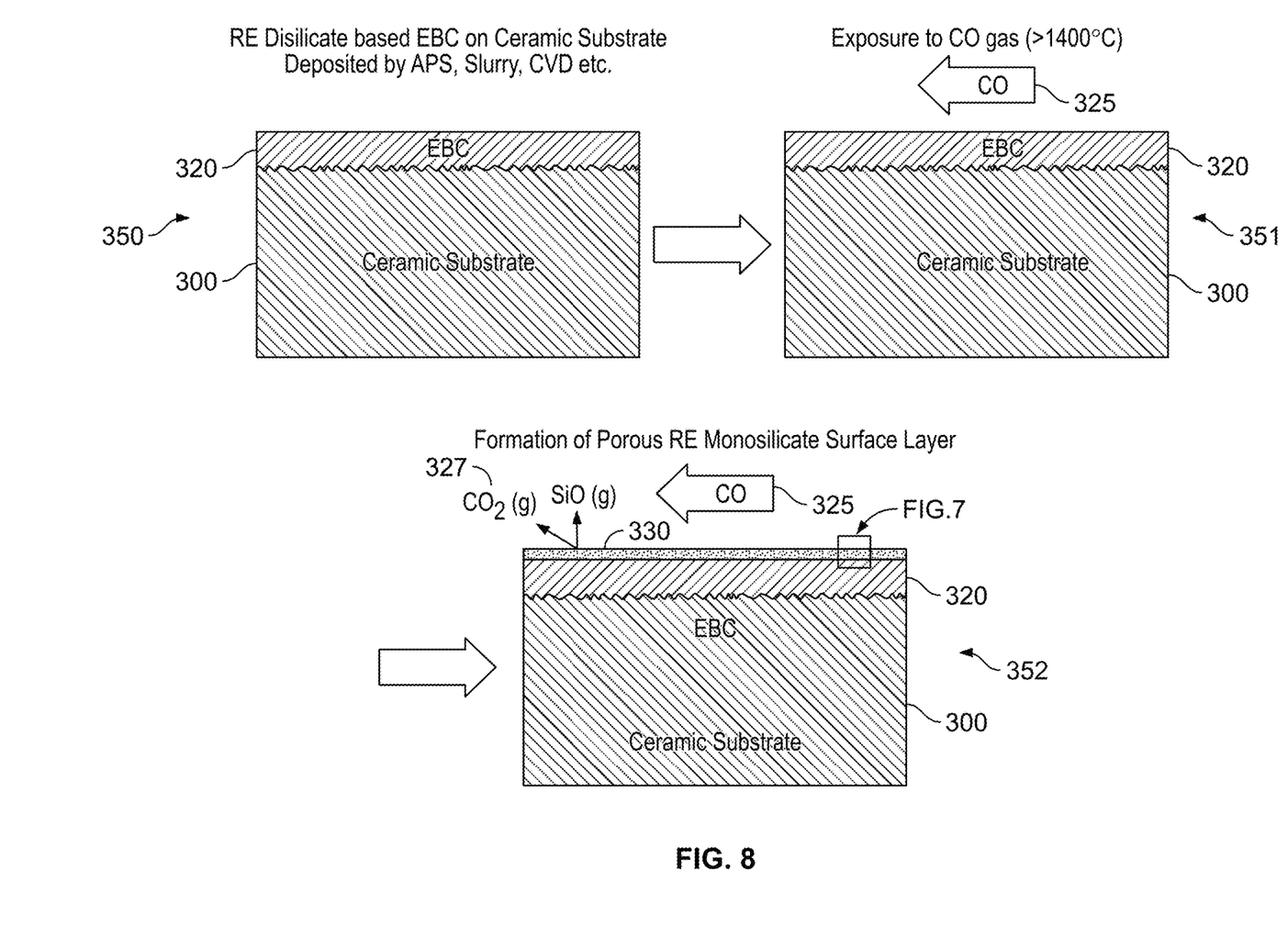
FIG. 8 is a process flow diagram for chemically-thermally converting a disilicate EBC layer to a porous monosilicate layer, in one exemplary embodiment.

In another embodiment, conversion of the disilicate to the monosilicate may be accomplished using a chemical-thermal treatment with exposure to carbon monoxide. Referring to FIG. 8, the disilicate EBC coated part (block 350) is exposed to temperatures 1400° C., preferably above 1500° C., or higher in a flow of carbon monoxide 325 (block 351). Above this temperature, a carbothermal reduction process will convert the disilicate coating to a monosilicate by the off gassing of SiO(g) and carbon dioxide 327. Laboratory observation has shown that the resulting surface of the coating is porous monosilicate layer that is intimately bonded to the underlying, unaffected disilicate EBC with a compositional gradient. The depth of the transformation can be controlled by time, temperature, CO concentration, and gas flow rate. For example, it has been observed that when the CO concentration is estimated to be in the rage of 1000 ppm (or 0.1%) at temperatures above 1550° C. the transformation occurred in about 30 minutes. Because this is a layer that is formed from the starting EBC, there is chemical transition that occurs between the dense disilicate EBC and the porous monosilicate TBC surface. FIG. 7 is a cross-sectional micrograph of an EBC layer 320 having been chemically-thermally treated as described above to form porous monosilicate layer 330. As can be seen, the porosity increases from the interface with layer 320 to the outer surface.

Infiltration of Metal Salts, Nitrates, Carbonates and/or Oxides

As initially noted, the previously-described forming of the porous monosilicate layer 330 results in a porous surface structure that can be further treated to form more stable high temperature oxides or silicides through the impregnation of different metal nitrates, carbonates, and/or oxides that can be reacted with the surface in a step separate from the coating sintering where there is risk of different phases to cause problems with the densification of the coating. The advantage of this being that high temperature phases can be achieved at temperatures low enough to prevent continued sintering of the EBC. Depending on what metal ions are introduced and to what degree, temperature stability can be further increased, or the coating can potentially be given an increased CMAS resistance. The use of this method on a coating already transformed to monosilicate with a porous structure reduces the risk of spallation due to any thermomechanical stresses associated with the newly formed phases caused by the metal ion additions or any stresses associate with thermal gradient during engine operation or engine transients. The metals of this infiltration layer may include, without limitation, materials including aluminum, zirconium, titanium, yttrium, hafnium, tantalum, ytterbium, strontium, and the like, depending on the desired function. The infiltration may be accomplished using a metal salt solution or a metal oxide nanoparticle suspension, as described below.

In accordance with one embodiment, the porous surface may be infiltrated with a metal salt solution with the desired metal ion (e.g. nitrate, carbonate, sulphate, chloride). The impregnated coating is dried in air and the component is calcined in air at a temperature above the decomposition temperature of the metal salt, resulting the metal oxide. The component can then be treated at high temperature to sinter or react the newly formed metal oxide to the base silicate coating. The amount of desired metal oxide added is controlled by the concentration of the salt solution.

In accordance with another embodiment, the porous surface may be infiltrated with a nano metal oxide suspension. For this embodiment, a suspension with nano metal oxide particles, surfactants, and binders (to ensure wetting) is prepared. The suspension is then applied to the treated coating surface. The impregnated coating dries, and then the organic binders and surfactants are burned out in air at an appropriately high temperature, depending on the exact binders and surfactants utilized. Finally, the coted component is heat treated at high temperature to sinter or react the nano particles to the coating. The amount of desired metal oxide added is controlled by the concentration of the solid loading of the nano particle suspension.

In either embodiment, all post-infiltration heat treatment temperatures will depend on the desired metal ion that will be introduced and their decomposition temperature, the reactivity/diffusivity of the resulting oxide with the monosilicate coating. For the nano metal oxide approach, the difference in the sintering temperature of the nanoparticles compared to the sintering temperature of the coating may be exploited to prefer the formation of a metal oxide surface over the monosilicate or the reaction with the monosilicate forming silicate with more than one metal ion. Temperatures between about 1000° C. and about 1500° C. are exemplary.

Further, in either embodiment, application of the salt solution or nano metal oxide suspension may be accomplished using, for example, spin-coating, dip-coating, spraying, roll coating, and others. In embodiments wherein there is a gradient in pore size, with smaller pores being located near layer 320, the metal oxide material may only infiltrate a certain portion of the depth of layer 330 (namely into the pores thereof). For example, in some embodiments, the metal oxide may infiltrate 70% or less of the thickness of layer 330, 50% of the thickness or less, or even 30% of the thickness or less. The amount of material of the metal oxide deposited thus depends on the thickness and desired fill properties of layer 330. Exact thickness for a given embodiment will ultimately be determined by the skilled artisan, but may generally be from about 5 mils to about 20 mils, as initially deposited. Infiltration of the metal oxide material into layer 330 may be accomplished in a variety of manners, including for example capillary action or an applied vacuum.

Infiltration Example #1— Salt Solution

Figure 9:
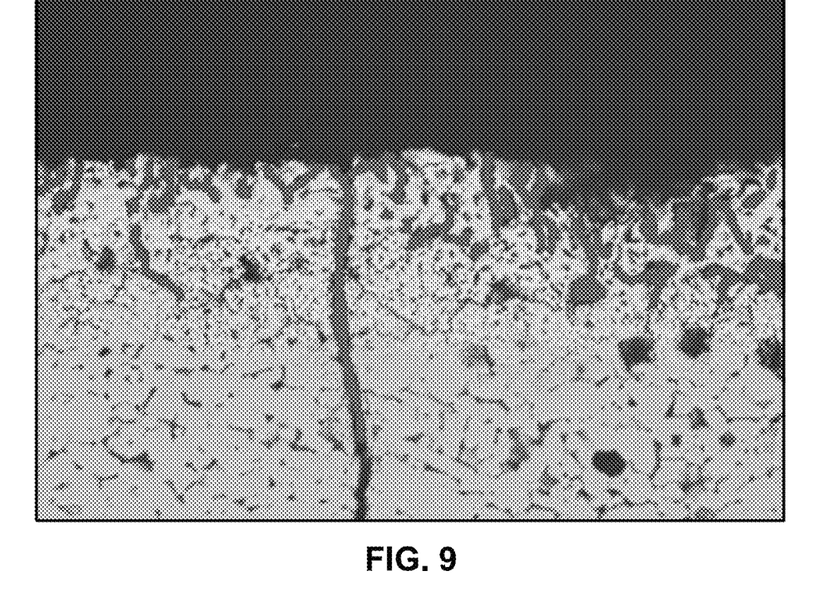
FIG. 9 is a cross-sectional micrograph of a disilicate EBC layer having been thermally treated to form porous monosilicate layer and having infiltrated therein one or more metal salts, nitrates, carbonates or oxides, in one exemplary embodiment.

An aqueous solution of hafnium chloride ($HfCl_4$) is prepared. The monosilicate layer surface is wet with this solution, dried, and calcined at 250° C. to decompose the salt to hafnium oxide. To increase the hafnium oxide loading, this step is repeated. A final heat treatment at >1250° C. is done to react the $HfO_2$ with the monosilicate resulting in a rare earth silicate (some of the oxide reacts to form the silicate and some remains as the oxide). The resulting coating layer is illustrated in FIG. 9, in micrograph.

Infiltration Example #2— Nano Metal Oxide Suspension

Figure 10:
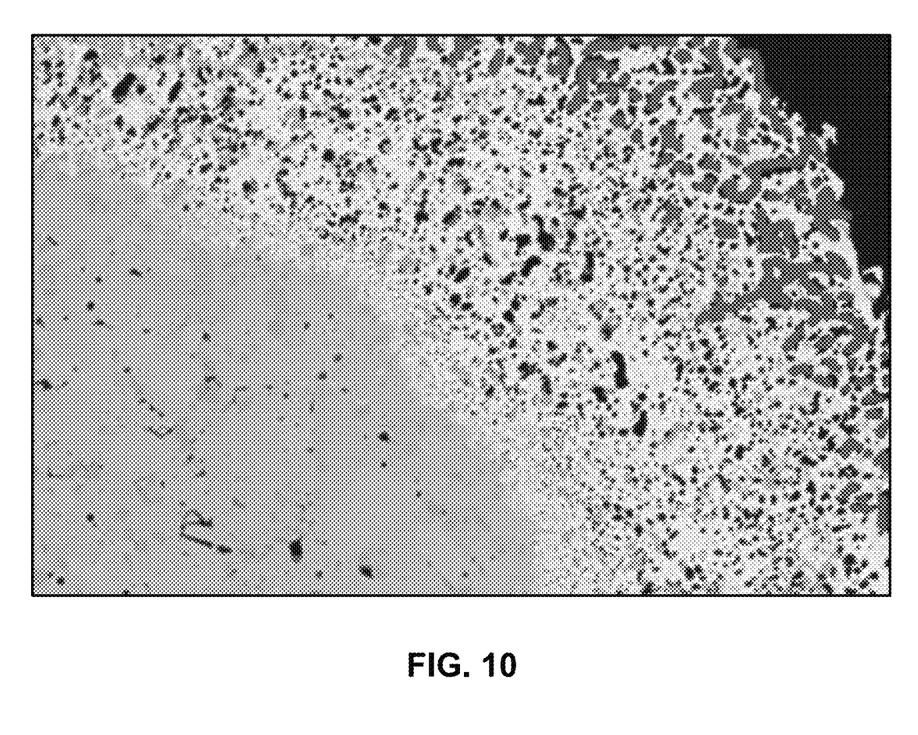
FIG. 10 is a cross-sectional micrograph of a disilicate EBC layer having been chemically-thermally treated to form porous monosilicate layer and having infiltrated therein one or more metal salts, nitrates, carbonates or oxides, in one exemplary embodiment.

A suspension with a high concentration of nano $HfO_2$ particles is prepared with and acrylic binder and surfactant to disperse the $HfO_2$ particles and ensure wetting of the monosilicate surface. The suspension is used to impregnate the monosilciate coating and is dried at 150° C. Any organic are then burned out in air at 300° C. A final heat treatment is done at >1250° C. to react the $HfO_2$ with the monosilicate resulting in a rare earth silicate. The resulting coating layer is illustrated in FIG. 10, in micrograph.

Accordingly, protective coating systems for gas turbine engine applications and methods for fabricating such protective coating systems have been provided. The disclosed embodiments beneficially provide a novel approach to creating an EBC/TBC coating for SiN and SiC—SiC substrate materials to allow the use temperature to be increased from about 2600° F. to about 2800° F.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method of applying a protective coating to a substrate comprises the steps of:
    providing a turbine engine component substrate formed of a ceramic matrix composite material;
    forming an environmental barrier coating layer comprising a rare earth disilicate material directly on the substrate;
    treating an outer surface of the environmental barrier coating layer to decompose or convert the rare earth disilicate in the outer surface of the environmental barrier coating layer to form a thermal barrier coating layer comprising a porous rare earth monosilicate material directly on the environmental barrier coating layer, wherein the step of treating the outer surface is performed using a thermal process consisting of the application of heat or a chemical-thermal process consisting of the application of heat and a chemical; and
    infiltrating at least a portion of the pores of the thermal barrier coating layer with a metal solution or suspension.

2. The method of claim 1, wherein the treating the outer surface of the environmental barrier coating layer is performed using the thermal process, and the thermal process comprises exposing the environmental coating barrier layer to an elevated temperature in excess of 2400° F. in a reducing or oxygen-poor environment for a period of time sufficient to cause the rare earth disilicate in the outer surface of the environmental barrier coating layer to decompose into the rare earth monosilicate.

3. The method of claim 1, wherein the treating the outer surface of the environmental barrier coating layer is performed using the chemical-thermal process, and the chemical-thermal process comprises exposing the environmental coating barrier layer to an elevated temperature in excess of 1400° C. and a flow of carbon monoxide gas for a period of time sufficient to cause a carbothermal reduction process and thereby cause the rare earth disilicate in the outer surface of the environmental barrier coating layer to convert into the rare earth monosilicate.

4. The method of claim 1, wherein the ceramic matrix composite material is a silicon carbide—silicon carbide (SiC—SiC) material or a silicon nitride (Si3N4) material.

5. The method of claim 1, wherein the metal solution or suspension comprises a metal element selected from the group consisting of: aluminum, zirconium, titanium, yttrium, hafnium, tantalum, ytterbium, and strontium.

6. The method of claim 1, wherein the metal solution or suspension comprises a metal nano oxide or a metal salt, nitrate, carbonate or oxide.

7. The method of claim 1, wherein the environmental barrier coating layer is formed to have a thickness of about 10 mils to about 100 mils.

8. The method of claim 1, further comprising controllably heat-treating the substrate after infiltrating the pores with the metal solution or suspension to sinter or react the metal solution or suspension to form a metal silicate material within the pores.

9. The method of claim 8, further comprising installing the turbine engine component substrate in a turbine engine after heat-treating the substrate to form the metal silicate material within the pores.

10. The method of claim 1, wherein infiltrating the metal solution or suspension is performed to infiltrate the thermal barrier coating layer to a depth of about 70% or less of a total thickness of the thermal barrier coating layer, thereby creating a porosity gradient in the thermal barrier coating layer.

11. The method of claim 1, wherein the thermal barrier coating layer is formed to comprise a plurality of pores such that the thermal barrier coating layer comprises a porosity of about 10% to about 70% by volume.

* * * * *